(12) United States Patent
Irving (10) Patent No.: US 10,012,564 B2
(45) Date of Patent: Jul. 3, 2018

(54) MPO SWITCH, FIBER TEST DEVICE, SYSTEM AND KIT

(71) Applicant: FiberNext, LLC, Concord, NH (US)

(72) Inventor: Ryan M. Irving, Belmont, NH (US)

(*) Notice: Subject to any disclaimer, the term of this patent is extended or adjusted under 35 U.S.C. 154(b) by 168 days.

(21) Appl. No.: 15/166,764

(22) Filed: May 27, 2016

(65) Prior Publication Data

US 2016/0349145 A1   Dec. 1, 2016

Related U.S. Application Data (60) Provisional application No. 62/169,317, filed on Jun. 1, 2015.

(51) Int. Cl.
| | | |
|---|---|---|
| *G01N 21/00* | (2006.01) | |
| *G02B 6/44* | (2006.01) | |
| *G02B 6/00* | (2006.01) | |
| *G01M 11/00* | (2006.01) | |
| *G02B 6/38* | (2006.01) | |
| *G02B 6/35* | (2006.01) | |

(52) U.S. Cl.
CPC ....... *G01M 11/3154* (2013.01); *G02B 6/3542* (2013.01); *G02B 6/385* (2013.01); *G02B 6/3885* (2013.01)

(58) Field of Classification Search
CPC ......... G01M 11/3154; G01M 11/3136; G01M 11/30; G01M 11/3109; G02B 6/3542; G02B 6/385; G02B 6/3885; G02B 6/14; G02B 6/444; H04B 10/071; H04B 10/2581
USPC ................................ 356/73.1; 385/100, 134
See application file for complete search history.

(56) References Cited

U.S. PATENT DOCUMENTS

| | | | | |
|---|---|---|---|---|
| 8,203,450 B2* | 6/2012 | German | ................ | H04Q 1/138 340/10.1 |
| 8,711,341 B2* | 4/2014 | Blair | ................ | G01M 11/3136 356/73.1 |
| 9,310,275 B1* | 4/2016 | Irving | ................ | G02B 6/4457 |
| 2007/0025676 A1* | 2/2007 | Russell | ............. | G01M 11/3136 385/134 |
| 2016/0315709 A1* | 10/2016 | Kachita | ................ | H04B 10/564 |

* cited by examiner

*Primary Examiner* — Sunghee Y Gray
(74) *Attorney, Agent, or Firm* — Catherine Napjus; Michael J. Persson; Lawson, Persson & Chisholm, PC (57) ABSTRACT

An MPO switch device that includes a first input/output port and a second input/output port, a MPO port, a plurality of switches disposed between the first input/output port and the second input/output port, and a switch control for controlling the position of each of the switches to direct light through a desired return path. The plurality of switches are arranged and connected together by non-blocking connections that allow simultaneous testing of all common 1 GB, 10 GB, and 40 GB transmit and receive fiber pair paths.

19 Claims, 7 Drawing Sheets

MPO SWITCH, FIBER TEST DEVICE, SYSTEM AND KIT

CLAIM OF PRIORITY

This application is claims the benefit of U.S. Provisional Patent Application Ser. No. 62/169,317 which was filed on Jun. 1, 2015.

FIELD OF THE INVENTION

The present invention relates to fiber test equipment, and in particular, to an improved MPO switch, fiber test device and kit for testing multi-mode fiber optic cables.

BACKGROUND

The challenge of testing high density MPO/MTP connectivity in data centers and plug-and-play networks is still being perfected. Recently, manufacturers have been working to develop new tools to speed the testing of mass connectors as the adoption of MPO connectors skyrockets in data centers where it's being for use in 40 and 100 GB connections.

Figure 1A:
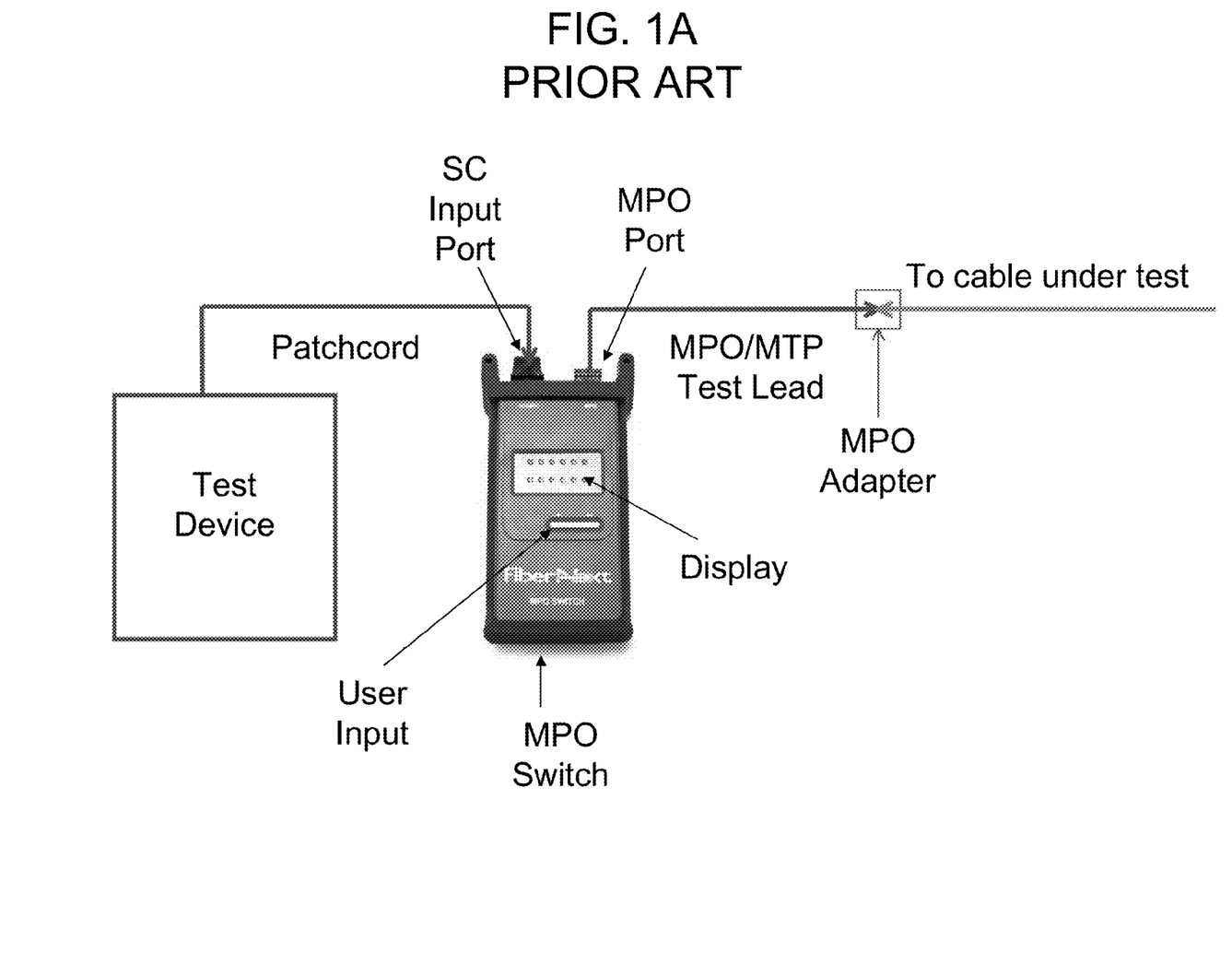
FIG. 1A is test system diagram showing a prior art MPO switch device and test system.
Figure 1B:
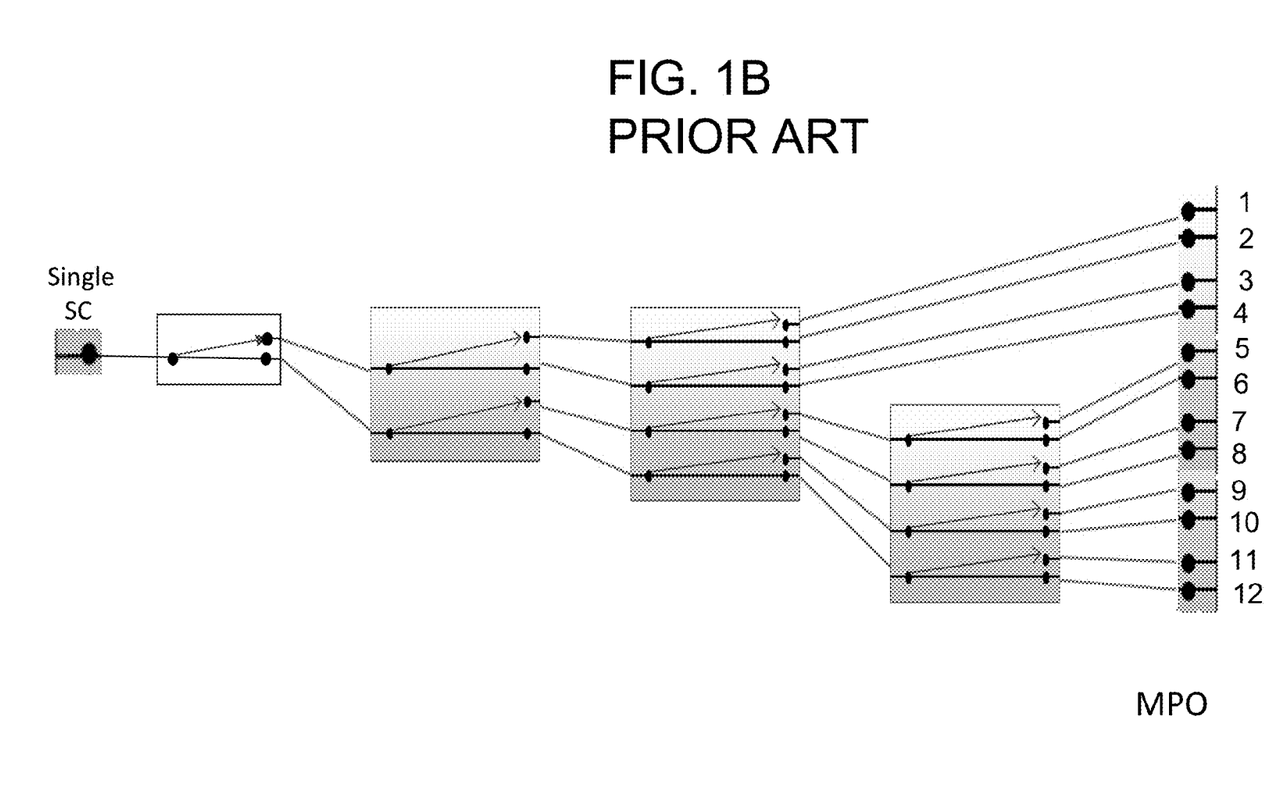
FIG. 1B is a diagrammatic view of the internal switch array of the prior art MPO switch terminating in a 12 fiber MPO connector.

FiberNext of Concord, New Hampshire, has marketed a prior art MPO switch device that allows all fibers of an MPO cable to be tested in a single direction. As shown in FIGS. 1A and 1B, the prior art MPO switch device includes a single SC Input port that connects the switch to a test device, such as an optical time-domain reflectometer (OTDR), optical fault locator (FL), or other fiber optic test device commonly utilized in the art. The combined test device and MPO switch form the prior art test system. The prior art MPO switch device also includes an MPO port that connects the device to the cable under test through the use of a test lead and MPO adaptor. FIG. 1B diagrams the operation of the prior art switch device, which includes a series of internal switches that direct the light from the test device to the fiber to be tested. These switches are controlled by a user input, which allows the user to select the fiber to be tested, and a display, such as an LCD display or a series of lights, provide a visual indication of which fiber is being tested.

In operation, the prior art MPO switch device is attached to the MPO cable to be tested and all fibers are individually tested in a single direction. However, in data applications, the MPO cable is used bi-directionally and must typically be tested in both directions. In these applications, odd numbered fibers, which terminate in ports 1, 3, 5, 7 9 and 11 in FIG. 1B, are used in one direction. Even numbered fibers, which terminate in even numbered ports 2, 6, 8 10 and 12 in FIG. 1B, are used in the opposite direction. Accordingly, once the odd numbered fibers are tested in one direction, the test device and MPO switch device must be disconnected and reconnected to the other end of MPO cable to test the even numbered fibers. This process can be time consuming, especially in large data center applications where thousands of cables need to be quickly and effectively tested. Accordingly, it has been common practice to use two prior art test stems, one at each end of the MPO cable under test. This is expensive and requires the results received by the two test devices to be run through specialized software that combines both into a single test result.

Figure 2:
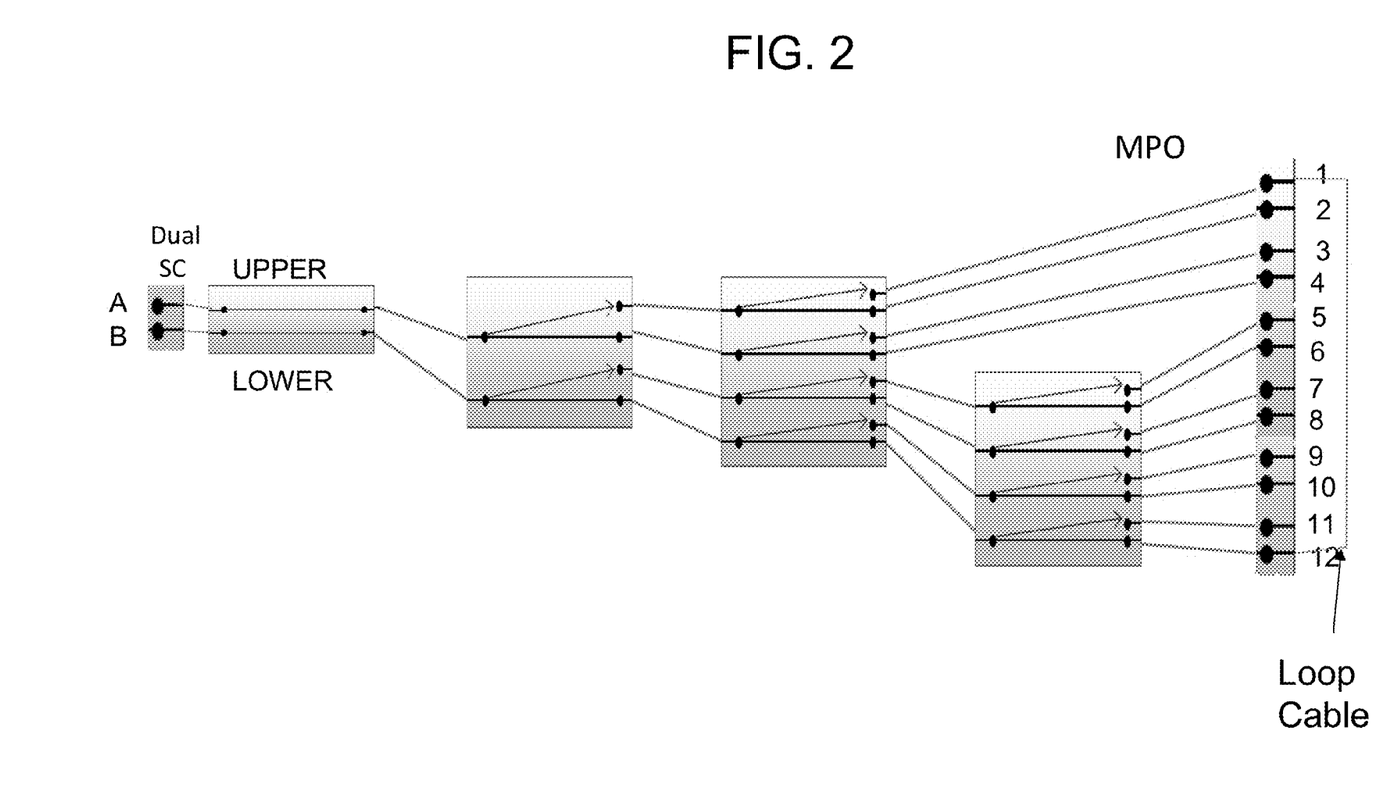
FIG. 2 is a diagrammatic view of the internal switch array of a multi-directional MPO switch terminating in a 12 fiber MPO connector in which loop cables are utilized.

One potential way to more quickly test cables in both directions without the use of two test systems is to utilize a multipath MPO switch with a feedback loop cable at the end of the cable under test. This potential solution is shown in FIG. 2, which shows an MPO switch device having two SC ports A and B, each capable of sending and receiving signals, in communication with a similar series of switches as was shown in FIG. 1B. Because the internal switches are in a set position and cannot be set to both transmit and receive singles, a series of feedback loop cables are attached to the ports such that light being transmitted from SC port A through the upper set of switches is then returned through the lower set of switches to SC port B. Thus, for example, fibers 1 and 12, 3 and 10, and 5 and 8 can be simultaneously tested. The test cables at the SC ports are then removed and reattached to the opposite ports and light is then transmitted from SC port B through the lower set of switches is then returned through the upper set of switches to SC port A, which allows the remaining fibers to be tested in both directions. Although this saves some time and does not require two separate test systems, it still requires the test device cables to be removed and reattached between sets of test, which introduces the potential for contamination and skewing of the test results. More importantly, it does not allow adjacent ports to be tested simultaneously, which means that the entire test must be completed to determine whether a single send/receive pair of fibers are operational.

Therefore there is a need for an improved MPO switch that allows an MPO cable to be bi-directionally tested using a single test system without the need for reattaching test system cables and without the need to test all fibers in order to determine whether adjacent pairs of fibers are operational.

SUMMARY OF THE INVENTION

The present invention is an MPO switch device, fiber test device and kit that overcome the drawbacks inherent in the prior art.

In its most basic form, the MPO switch device includes a first input/output port and a second input/output port, a MPO port, a plurality of switches disposed between the first input/output port and the second input/output port, and a switch control for controlling the position of each of the switches to direct light through a desired return path. The plurality of switches are arranged and connected together by non-blocking connections that allow simultaneous testing of all common 1 GB, 10 GB, and 40 GB transmit and receive fiber pair paths.

In practice, a fiber cable under test is plugged into the MPO port and a patch cord or other connection connects on one end to each of the first and second input/output ports and at the other end to a test device. As used herein, "test device" means any commonly use fiber optic test device for assessing various aspects of a fiber under test. "Test devices" include non-exclusively OTDRs, certification testers, optical fiber locators, visual fault locators, power meters, loss testers, fiber identifiers, inspection microscopes, network testers, coarse wavelength division multiplexing testers, dense wavelength division multiplexing testers, fiber length testers, pass/fail testers, or bit error rate testers.

The preferred MPO switch device is a handheld device that includes a housing within which the plurality of switches is disposed in a switch array. The first input/output port, second input/output port, and MPO port extend from the top of the housing and are connected to the switch array such that the first port is in communication with an upper switch path and the second port is in communication with a lower switch path. It is understood that the "upper" and "lower" designations are arbitrary and do not necessarily indicate that one path is higher or above the other. The switch array preferably includes multiple multi-gate switches that are connected by crossed connections that ensure that the light path from adjacent fibers 1 and 2, 3 and 4, 5 and 6, etc. are directed to different input/output ports; i.e. if fiber 1 follows the upper switch path, fiber 2 follows the lower switch path. The first and second input/output ports are preferably SC ports, but maybe any type of port commonly used in the art.

The first and second input/output ports are the beginning of the upper and lower switch light paths. As such, a light source is necessary to provide light through these paths and through the fibers under test. In some embodiments, the first and second input/output ports are, as their name suggests, ports on the exterior of the housing of the MPO switch device. In such embodiments, the first and second input/output ports are connected to the test device by any type of cable or patch cord commonly used for such a purpose, such as is shown in FIG. 1A, and the light source is on or within the test device. In other embodiments, however, the first and second input/output ports are not necessarily "ports" as the term is commonly used, but are internal to the MPO switch device. In other words, they are not ports on the exterior of the MPO switch device's housing, but are internal beginnings of the light paths, and the light source is also included within the housing to light these paths.

The preferred MPO switch device includes a display, a manual user interface, and a USB port. The display preferably shows at least the fibers under test, but preferably also shows the return path mode and the polarity of the test. The manual user input is preferably a plurality of buttons, or other art-recognized indicators, that are in connection with a switch control module and allow the user to control the fibers under test, the return path mode and the polarity of the test. The USB port is in communication with a battery within the housing and serves as the power input for recharging the battery. The battery is in electronic and/or electrical communication with at least the switch control module. The battery powers both the switch control module and the switch array. However, in some embodiments, the USB port is also in communication with the switch control module through a communication module that includes hardware and software to allow the switch to communicate with and/or be controlled by an external device, such as a computer or test device.

The kit of the present invention includes the MPO switch device of the present invention and at least one loop cable connector. In the preferred embodiment of the kit, the loop cable connector is arranged such that the adjacent fibers are looped; i.e. such that light passing through fiber 1 will loop back and return through fiber 2. The cable under test has two ends. One end is plugged into the MPO switch device of the present invention. The loop cable connector is connected to the other end of the cable under test, i.e. the end that is not plugged into the MPO switch device.

In another embodiment of the kit adapted for use in visual testing, optical loss testing, or bit error rate testing, a pair of MPO switch devices is provided with a pair of MPO test leads. Each of the MPO test leads are adapted to connect only to certain fibers and the MPO switches are adapted to communicate with each other such that bi-directional two-fiber testing may be performed from two ends of an MPO cable to be tested.

The test system of the present invention includes at least one test device and at least one MPO switch of the present invention. In a preferred embodiment for use in visual, loss, or bit error rate testing the system includes a pair of MPO switch devices with a pair of MPO test leads. Each of the MPO test leads are adapted to connect only to certain fibers and the MPO switches are adapted to communicate with each other such a that bi-directional visual testing may be performed from two ends of an MPO cable to be tested.

The fiber test device of the present invention includes the switch array and switch control of the MPO switch device integrated into a test device, such as an OTDR, optical fault locator, or the like. In such embodiments, the test device includes an MPO port and the input/output ports but the user control panel and display may not be present as they could be controlled by the host device. The host test device would then have direct control of both the optical test and the switch allowing the tester to move to the next fibers to be tested and begin immediately, thus automating the process and greatly decreasing test time.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Figure 3A:
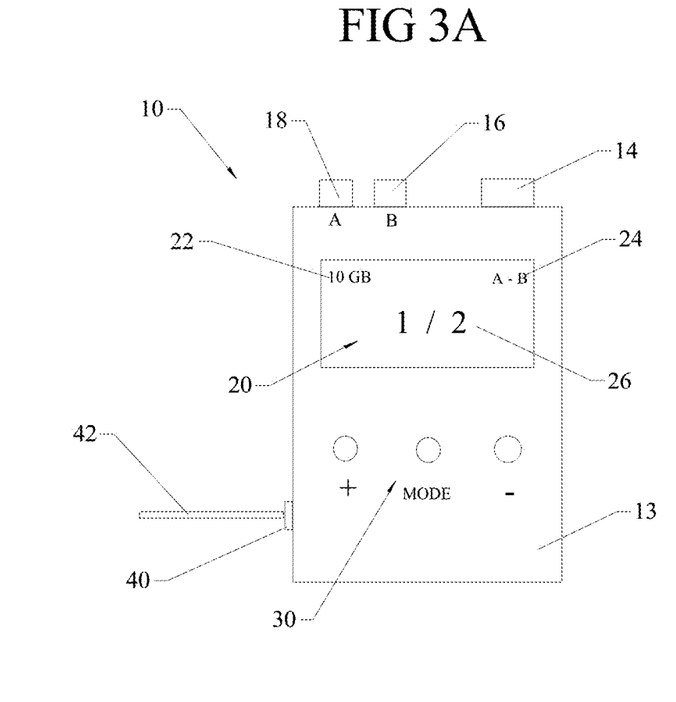
FIG. 3A is a front view of preferred multi-directional MPO switch device of the present invention.
Figure 3B:
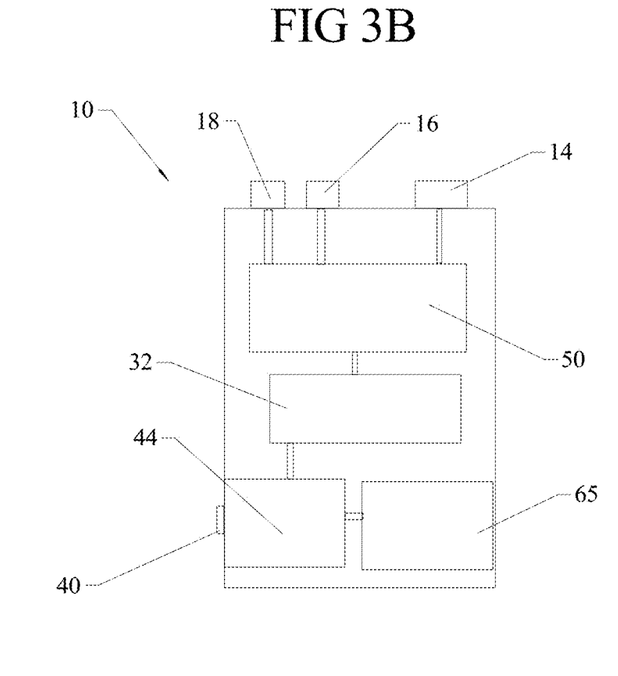
FIG. 3B is a cut away front view of the multi-directional MPO switch device of FIG. 3A showing the functional blocks located within the housing.
Figure 3C:
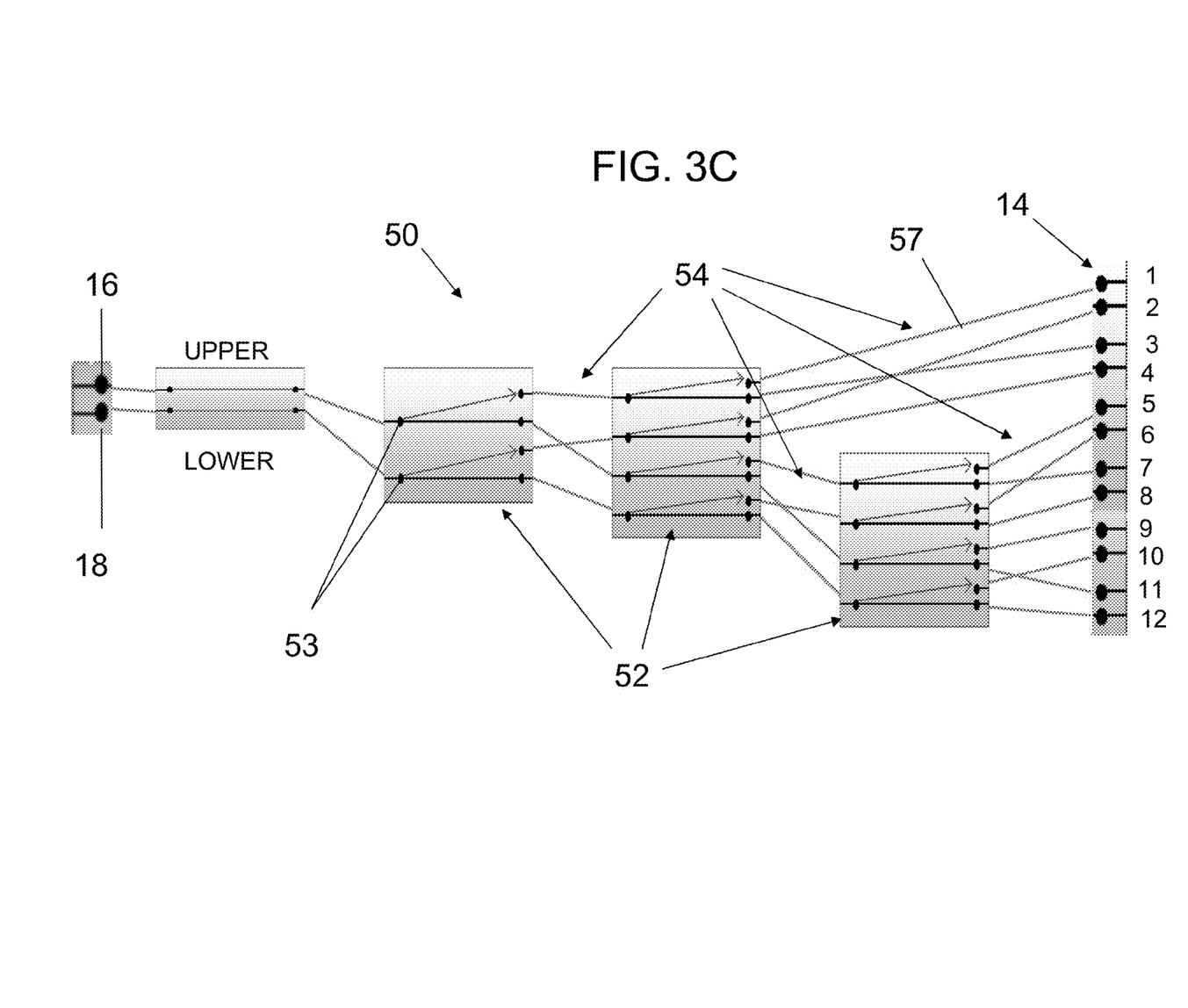
FIG. 3C is a diagrammatic view of the internal switch array of the preferred multi-directional MPO switch device of the present invention terminating in a 12 fiber MPO connector.

Referring now to FIGS. 3A-3C, the preferred MPO switch device 10 is a handheld device that includes a housing 13 within which the plurality of switches is disposed in a switch array 50. A first input/output port 16, a second input/output port 18, and an MPO connector port 14 extend from the top of the housing 13 and are connected inside of the housing 13 to the switch array 50. The MPO switch device 10 includes a display 20, a user interface 30, and a fourth port 40. Fourth port 40 is preferably a USB port, but may be any type of port commonly used for the functions described herein relating to USB port 40. Although the terms "fourth port 40" and "USB port 40" are used interchangeably herein, it is understood that fourth port 40 is not necessarily a USB port, but is preferably a USB port.

As shown in FIG. 3A, the display 20 is preferably and LCD display that visually indicates at least the fibers under test 26, but preferably also shows the return path mode 22 and the polarity of the test 24. It is noted that the display 20 may take many forms, including a touch screen, a series of lights, or other art recognized visual indictors. However, it is noted that in embodiments of the MPO switch device 10 that are designed for control by a computer or test device, the display 20 is omitted. In addition, it is understood that return path mode 22, polarity of the test 24, and fibers under test 26 may be displayed in many ways on display 20, and the manner in which they are displayed in FIG. 3A is merely exemplary.

The user interface 30 is preferably a manual user interface made up of a plurality of buttons that are in connection with a switch control module 32 inside of the housing 13. However, the user interface 30 may be integrated into a touch screen display, a series of manual DIP style switches, or other art recognized means for manually controlling the test parameters. In some embodiments, there is no manual user interface 30 and the test is controlled entirely by an external device, such as a computer or a test device. In some such embodiments, the external device is attached via a cable 42 attached to the USB port 40. In still other embodiments, the MPO switch device 10 includes a wireless communication interface (not shown), such as those marketed under the trademark BLUETOOTH, that communicates with the switch control module 32.

The USB port 40 is preferably a micro USB port that includes at least a set of charging terminals in communication with a battery 65 within the housing 13 to allow it to serve as the power input for recharging the battery 65. However, as noted above and as shown in FIG. 3B, the USB port 40 is also in communication with the switch control module 32 through a communication module 44 that includes hardware and software to allow the switch to communicate with and/or be controlled by an external device, such as a computer or test device.

Referring now to FIG. 3C, the switch array 50 includes plurality of switches 52 and disposed between the first input/output port 16, the second input/output port 18, and the MPO connector port 14. First and second input/output ports 16, 18, may be external ports as shown in FIG. 3A, which are then connected to a test device through a patch cord. A light source to travel through upper and lower light paths of switch array 50 and the fibers of MPO connector port 14 is then provided by the test device. In other embodiments, however, first and second input/output ports 16, 18 are internal to housing 13 and MPO switch device 10 also includes a light source within housing 13 to light the paths of switch array 50 through first and second input/output ports 16, 18.

Each of the switches 52 of the switch array 50 are preferably mechanical switches that include at last two gates 53 to direct light in a desired path. The plurality of switches are arranged and connected together by non-blocking connections 54 that allow simultaneous testing of all common 1 GB, 10 GB, and 40 GB transmit and receive fiber pair paths. The first port 16 is in communication with an upper switch path and the second port 18 is in communication with a lower switch path. The non-blocking connections 54 are preferably accomplished by splicing the connecting fibers 57 in an arrangement that ensures that the light path from adjacent fibers 1 and 2, 3 and 4, 5 and 6, etc. on the MPO connector port 14 are directed to different input/output ports 16, 18; i.e. if fiber 1 follows the upper switch path, fiber 2 follows the lower switch path.

Although the preferred switches 52 are mechanical switches, it is recognized that MEM switches could also work. Further, the use of mechanical switches is only preferred for MPO connectors having up to 24 fibers due to excessive losses and reflections from the switches themselves. It is also recognized that the switch array 50 may take other forms and that specialized switches could be developed to accomplish the desired result. However, the switch array 50 of FIG. 3C is preferred due to the fact that it provides a far lower cost solution by utilizing commonly available switches 52 to achieve what would cost four to five times more using currently available 1×12 switches.

Figure 4A:
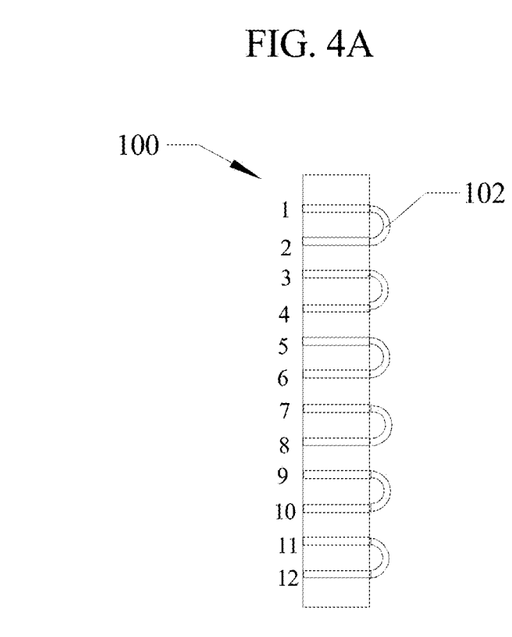
FIG. 4A is a diagrammatic view of one embodiment of the loop cable connector of the kit of the present invention.
Figure 4B:
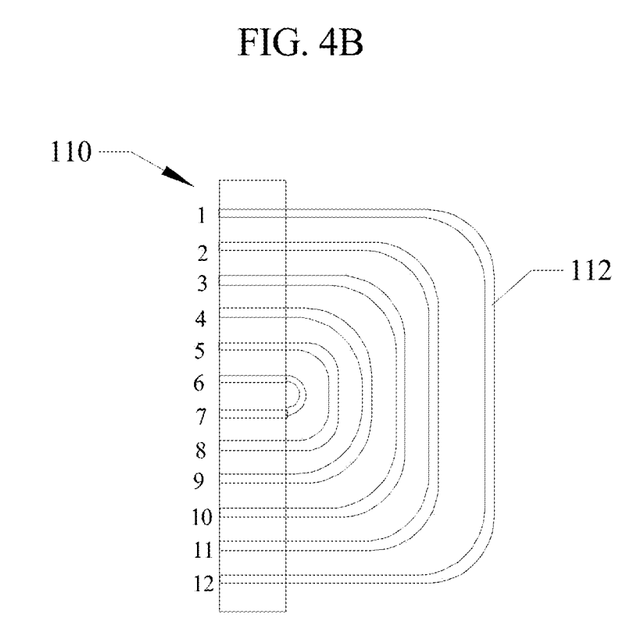
FIG. 4B is a diagrammatic view of another embodiment of the loop cable connector of the kit of the present invention.

The kit of the present invention includes any embodiment of the MPO switch device 10 of the present invention, as described above, and at least one loop cable connector, such as the loop connectors 100 and 110 of FIGS. 4A and 4B. Loop cable connector 100 or 110 connect to the end of the fiber under test that is not plugged into MPO switch device 10. In the loop cable connector 100 of FIG. 4A, which is adapted for testing 10 GB systems, the loop cables 102 connect adjacent ports. In other words, assuming the fiber under test includes n fibers, where n is an even integer, with loop cable connector 100, shown in FIG. 4A, fiber 1 is looped to fiber 2, fiber 3 is looped to fiber 4, and so in a similar manner until fiber n−1 is looped to fiber n. Herein, this configuration of looping adjacent fibers to one another is called "adjacent looping." In the loop cable connector 110 of FIG. 4A, which is adapted for testing 40 GB systems, the loop cables 112 connect ports differently. Again assuming the fiber under test includes n fibers, where n is an even integer, with loop cable connector 110, shown in FIG. 4B, fiber 1 is looped to fiber n, fiber 2 is looped to fiber n−1, fiber 3 is looped to fiber n−2, and so on until fiber n/2 is looped to fiber (n/2+1). Herein, this configuration of looping fibers starting by looping the fibers at the extremes is called "opposite looping." It is noted that not all ports are used in the 40 GB system, but this loop connector 110 includes loops from all ports to allow it to be used for both 10 GB and 40 GB systems. Likewise, although adapted for 10 GB testing, the loop connector 110 of FIG. 4A may also be used to test 40 GB systems.

Figure 5:
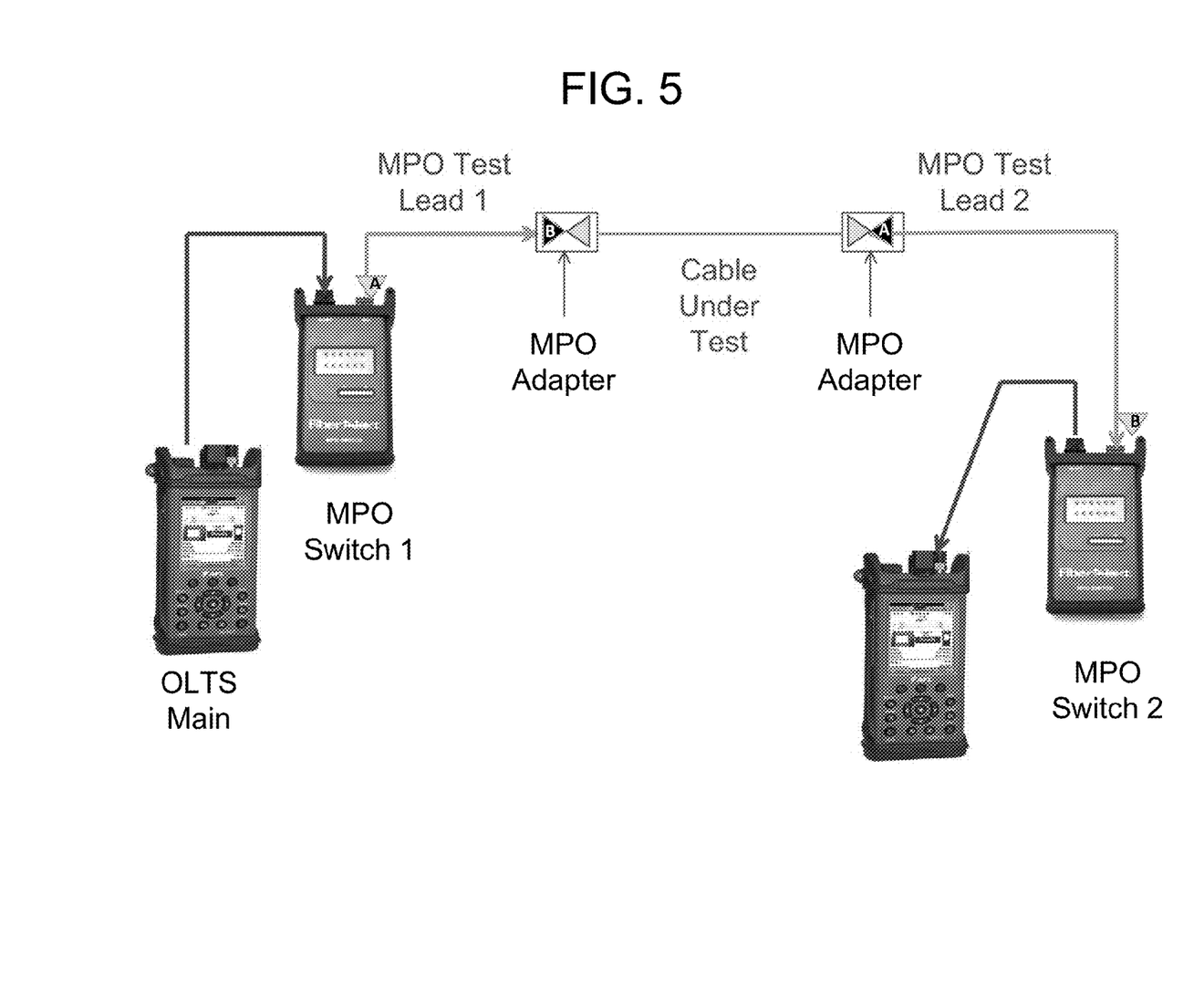
FIG. 5 is a diagrammatic view of one embodiment of the test system of the present invention.

Referring now to FIG. 5, one embodiment of the test system of the present invention is shown. The test system of FIG. 5 is adapted for use in visual, loss, or bit error rate testing and includes a pair of MPO switch devices with a pair of MPO test leads. Each of the MPO test leads are adapted to connect only to certain fibers and the MPO switches are adapted to communicate with each other such a that bi-directional visual testing may be performed from two ends of an MPO cable under test.

The fiber test device of the present invention includes the switch array 50 and switch control module 32 of the MPO switch device integrated into a test device, such as an OTDR, optical fault locator, or the like. In such embodiments, the test device includes an MPO port 14 but the input/output ports 16, 18 are internal ports to the test device. Therefore, it is understood that in some embodiments input/output "ports" does not necessarily indicate a traditional port from which a cable or other connector may be plugged in or removed. An internal switch control automatically controls the switches of the switch array 50 and the test. This internal switch control preferably includes a timing circuit to tell when to begin the test, when the test is completed, and when to move on to the next switch position. In a preferred embodiment, the test device also includes a loss meter to measure the loss through the cable under test, a processor, and software and storage to take in data and process it.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. An MPO switch device for use with a fiber cable under test comprising multiple fibers, a test device, and a connection between said MPO switch device and the test device, said MPO switch device comprising:
a first input/output port;
a second input/output port, wherein the connection between said MPO switch device and the test device is between said first and second input/output ports and the test device;
an MPO connector port into which the fiber cable under test is connected;
a plurality of switches disposed between and in communication with said first input/output port, said second input/output port, and said MPO connector port; and
a switch control module that controls a position of each of said plurality of switches, wherein the position designates a path through which light is directed through the fibers of the fiber cable under test;
wherein said plurality of switches are arranged and connected to one another by non-blocking connections that allow simultaneous testing of the fibers of the fiber cable under test.

2. The MPO switch device as claimed in claim 1, further comprising a housing comprising:
said first and second input/output ports and said MPO ports disposed upon said housing;
said plurality of switches and said switch control module disposed within said housing; and
a display disposed upon said housing that displays information regarding a test of the test device.

3. The MPO switch device as claimed in claim 2, further comprising a fourth port disposed upon said housing, wherein said fourth port allows said MPO switch device to be connected to an external device.

4. The MPO switch device as claimed in claim 3, further comprising a battery disposed within said housing in communication with at least said switch control module, such that said battery powers said switch control module and said plurality of switches, and wherein said fourth port is in communication with said battery, such that the external device connected to said MPO switch device through said fourth port recharges said battery.

5. The MPO switch device as claimed in claim 3, further comprising:
a battery disposed within said housing in communication with at least said switch control module, such that said battery powers said switch control module and said plurality of switches; and
a communication module disposed within said housing, wherein said communication module is in communication with said fourth port and said switch control module such that the external device connected to said MPO switch device through said fourth port controls said switch control module.

6. The MPO switch device as claimed in claim 5, wherein the external device is the test device.

7. The MPO switch device as claimed in claim 3, wherein said fourth port is a micro USB port.

8. The MPO switch device as claimed in claim 2, wherein said information displayed by said display comprises which of the fibers of the fiber under test is being tested as a part of the test of the test device.

9. The MPO switch device as claimed in claim 8, wherein said information further comprises a return path mode and a polarity of the test.

10. The MPO switch device as claimed in claim 2, further comprising a battery disposed within said housing in communication with at least said switch control module, such that said battery powers said switch control module and said plurality of switches.

11. The MPO switch device as claimed in claim 2, further comprising a user interface disposed upon said housing that allows a user to operate said switch control module.

12. The MPO switch device as claimed in claim 1, wherein each of said plurality of switches is a mechanical switch comprising at least two gates that direct light through one of at least two paths.

13. The MPO switch device as claimed in claim 1, wherein said first input/output port is in optical communication with an upper switch path and said second input/output port is in optical communication a lower switch path.

14. The MPO switch device as claimed ill claim 13, wherein said upper and lower switch paths comprise connecting fibers, and said non-blocking connections allowing simultaneous testing is achieved by splicing said connecting fibers such that light traveling through a first fiber within the fiber to be tested travels through one of said upper switch path and said lower switch path and light traveling through a second fiber adjacent to the first fiber within the fiber to be tested travels through the other of said upper switch path and said lower switch path.

15. The MPO switch device as claimed in claim 13, further comprising a housing and a light source disposed within said housing, wherein said first and second input/output ports are internal to said housing and in light communication with said light source.

16. The MPO switch device as claimed in claim 1, further comprising a patch cord that is the connection between said MPO switch device and the test device.

17. The MPO switch device as claimed in claim 1, wherein the connection is wireless.

18. The MPO switch device as claimed in claim 1, wherein:
the test device comprises a housing and a test device control module that controls operations of the test device;
said first input/output port, said second input/output port, said plurality of switches, and said switch control module are disposed within the housing of the test device;
said switch control module is an internal switch control in electronic communication with the test device control module such that the test device control module also controls said switch control module; and
said MPO connector port is disposed on the housing of the test device.

19. The MPO switch device as claimed in claim 18, wherein said internal switch control comprising a timing circuit that controls beginning a test, completing a test, and positioning each of said plurality of switches.

* * * * *